United States Patent [19]
Slatter et al.

[11] 4,020,926
[45] May 3, 1977

[54] BRAKE APPARATUS INCLUDING PRESSED OR STAMPED COMPONENTS

[75] Inventors: John Reginald Slatter, Windsor Berks; James Albert Jackson, Hyde Heath; John Gedny Brooks, Heston; Albert John Clark Ward, Cookham; Alan Dewhurst, Denham, all of England

[73] Assignee: Dewhurst & Partner Limited, Hounslow, England

[22] Filed: Feb. 10, 1976

[21] Appl. No.: 656,937

[30] Foreign Application Priority Data

Feb. 12, 1975  United Kingdom .............. 6062/75

[52] U.S. Cl. ................................ 188/75; 188/171; 188/216
[51] Int. Cl.² ........................................ F16D 49/16
[58] Field of Search .......... 188/171, 173, 170, 216, 188/74, 75, 76, 72.9, 72.6; 192/90

[56] References Cited

UNITED STATES PATENTS

| | | | |
|---|---|---|---|
| 2,775,320 | 12/1956 | Vallen | 188/171 |
| 3,322,242 | 5/1967 | Copland | 188/171 |
| 3,348,639 | 10/1967 | Ames et al. | 188/171 |
| 3,356,190 | 12/1967 | Prussak | 188/171 |

*Primary Examiner*—Trygve M. Blix
*Assistant Examiner*—Douglas C. Butler
*Attorney, Agent, or Firm*—Lawrence E. Laubscher

[57] ABSTRACT

A brake apparatus having components formed from sheet metal pressings or stampings which brake apparatus includes a pair of brake arms each pivotally connected with a base on opposite sides of a brake drum. The brake arms are spring-biased together to urge brake shoes thereon into braking engagement with opposite sides of a brake drum, respectively. A normally de-energized brake release mechanism is provided for pivoting the brake arms apart against the force of the spring biasing device, thereby releasing the brake shoes from engagement with the drum. The base and the brake arms are constructed as assemblies of sheet metal pressings, and the electromagnetic parts of the brake release mechanism include lamination stacks which are sandwiched between side plates of one of the arms.

8 Claims, 8 Drawing Figures

BRAKE APPARATUS INCLUDING PRESSED OR STAMPED COMPONENTS

BACKGROUND OF THE INVENTION

This invention concerns improvements in or relating to brakes and particularly to brakes of a type for cooperation with a brake drum and comprising a pair of arms each pivotally coupled to a base and each carrying a brake block mounted on a brake shoe so that, in use, the brake blocks can engage opposite sides of a brake drum coupled to the apparatus with which the brake is used, spring means biassing the arms about their pivots so that the brake blocks are urged towards one another for effecting braking, and a powered brake release mechanism arranged, when energized, to exert a force such as to overcome the spring biassing of the arms and pivot the arms apart so as to release the brake pads from engagement with the drum. The brake release mechanism may be electromagnetically powered from a d.c. source or from an a.c. single or polyphase source for example, or may be pneumatically or hydraulically powered; whilst this invention will be described herein with particular reference to electromagnetically powered brakes, the invention is not restricted to such a power source.

STATEMENT OF PRIOR ART

Brakes of the abovementioned type are known from the Specification of British Pat. No. 889,924 of Dewhurst and Partner Limited (to whom the current application has been assigned) and from the Specification of British Pat. No. 1,213,642 of Elliston, Evans and Jackson Limited for example, and have commonly been used for the most arduous and widely varying duties such as for example for braking hoists, cranes, conveyors, machine tools etc., in may kinds of industrial applications.

BRIEF SUMMARY OF THE INVENTION

It has been traditional in this art to construct brake mechanisms by employing metal castings for such parts as the base, the brake arms, the brake shoes etc., such castings traditionally providing the rugged strength required for the generally heavy duty applications to which the brakes are commonly subjected. To obtain a sufficient degree of dimensional precision, the traditionally used metal castings required a number of finishing machinings. These traditional constructional methods produced brakes which have proven satisfactory in use, but which were heavy and cumbersome and subject to casting fractures, and, furthermore, the production and subsequent machining of the castings has been a time consuming and costly, labour intensive exercise.

It is an object of this invention to provide a brake mechanism which can be constructed without recourse to traditional and expensive metal casting methods.

Another object of the invention is to provide a brake mechanism constructed from pre-formed components which are dimensionally precise in themselves and require no machining operations to bring them into dimensional tolerance.

A further object of the invention is to provide a brake mechanism of streamlined and light weight design which nonetheless provides the necessary robust strength for heavy duty applications.

Yet a further object of the invention is to simplify the constructions of brake mechanisms of the type with which the invention is concerned by adoption of a constructional method which provides significant design advantages.

These and further objects of the invention are realized by a brake mechanism construction which takes advantage of constructional methods employing sheet metal pressings or stampings which are dimensionally precise in themselves and afford further advantages in respect of their light weight (as compared to metal castings) and superior strength. The departure from traditional methods taught by the instant invention provides significant advantages as will become apparent hereinafter.

Briefly described, an exemplary and presently preferred embodiment of the invention is a brake comprising a pair of brake arms each constructed as an assembly of at least one sheet metal pressing, a base formed as an assembly of at least one sheet metal pressing, said arms each being pivotally coupled to the base, a brake block mounted on a brake shoe carried by each said arm whereby, in use, the brake blocks can engage opposite sides of a brake drum coupled to the apparatus with which the brake is used, said brake shoes being carried by said brake arms at intermediate locations thereon, a rod pivotally coupled with the end of one of said brake arms remote from the end thereof coupled with the base, a fixed spring seat associated with the other of said brake arms and formed to provide a passage therethrough for said rod, said rod extending through said passage, a floating spring seat at the end of said rod spaced from said fixed spring seat, a compression spring assembled between said fixed and floating spring seats and around said rod and serving to bias the brake arms about their pivots to thereby urge the brake blocks towards one another for effecting braking, and a powered brake release mechanism arranged for exerting upon said rod a force such as to overcome the spring biassing of the arms and pivot the arms apart to release the brake.

The particular nature of this invention and the objects and many advantages thereof will be best appreciated from the following detailed description of an electromagnetic brake, adapted to be powered from a single phase a.c. source, which embodies in exemplary fashion all of the features of this invention. The description is made with reference to the accompanying drawings.

DETAILED DESCRIPTION OF THE INVENTION

Figure 1:
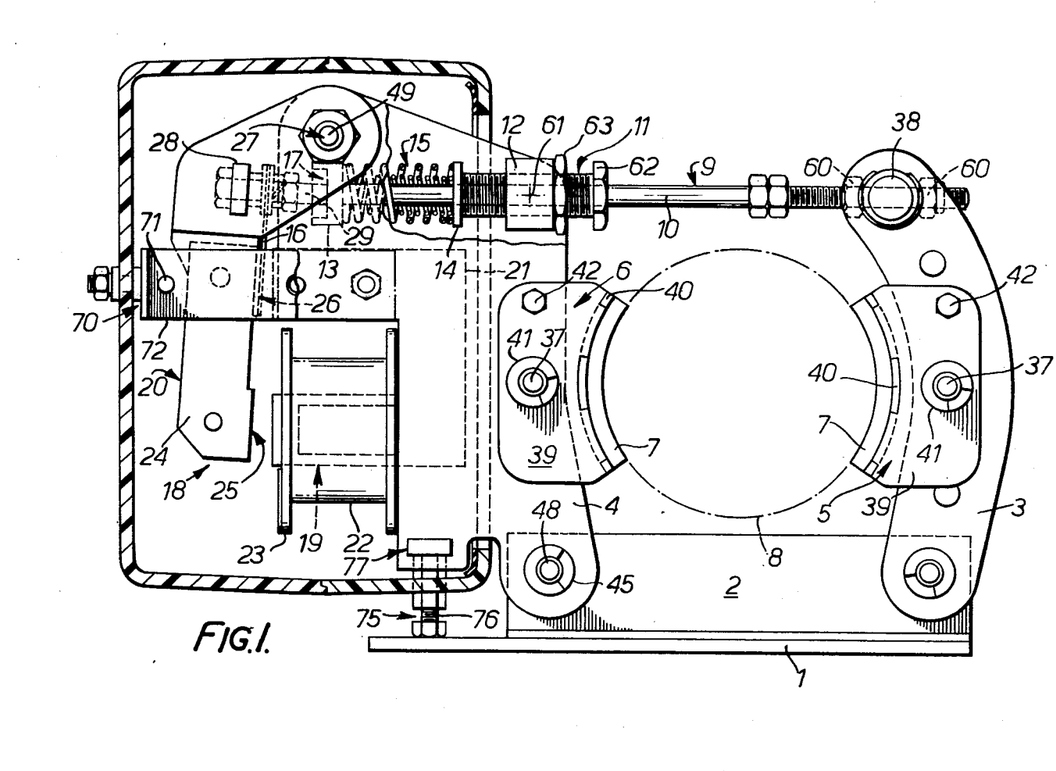
FIG. 1 shows a side elevation view of the complete brake mechanism.

Referring first to FIG. 1, the electromagnetic brake shown therein comprises a base 1 having two angled sections 2 spot-welded thereto so as to provide two spaced parallel upstands whereto a pair of arms 3 and 4 are pivotally connected as shown. Arm 3 will be referred to hereinafter as the 'plain' arm, and arm 4 will be referred to hereinafter as the 'magnetic' arm of the brake. Each of the arms 3, 4 carries a pivotally-mounted brake shoe 5, 6 respectively whereto a composition brake block 7 is riveted. Shown in phantom is a brake drum 8 illustrated in cooperation with the brake mechanism shown in brake-applied configuration.

The magnetic arm 4 serves as the principal supporting structure for the brake operating mechanisms and, in order to accommodate this function, is formed of a pair of metal plates of substantial surface area secured together by a number of riveted struts so as to sandwich between the plates various components of the brake mechanism as described hereinafter. The shape of the plates forming magnetic arm 4 is shown clearly in FIG. 1. The plain arm 3 serves only as a mounting for brake shoe 5 and, whilst formed similarly to the magnetic arm 4, is a considerably smaller structure.

An operating linkage 9 couples the upper ends of the arms 3 and 4 to one another through a compression spring which serves to provide the braking torque of the described brake mechanism. A push rod 10 is adjustably secured at one end to the upper end of plain arm 3 by means of a pivotal coupling, and extends across the gap between the two arms 3, 4 to an upper position on magnetic arm 4 where it is mounted freely within and passes through a coaxial hollow cylindrical bush 11 which is adjustably mounted in a block 12 pivoted between the two plates defining the magnetic arm 4. The push rod 10 terminates beyond the bush 11 and block 12 in a fixed spring seat 13 which serves the functions, firstly, of defining in association with a corresponding floating spring seat 14 on bush 11 a captive location for a double compression spring 15, and secondly, of providing a recessed surface 17 to accept application to the push rod 10 of an electromagnetically-generated brake release force. It will be seen that any movement of the push-rod 10 in a direction from left to right as viewed in FIG. 1 will cause the arms 3, 4 to pivot apart thereby to release the brake blocks from engagement with the brake drum.

Figure 4:
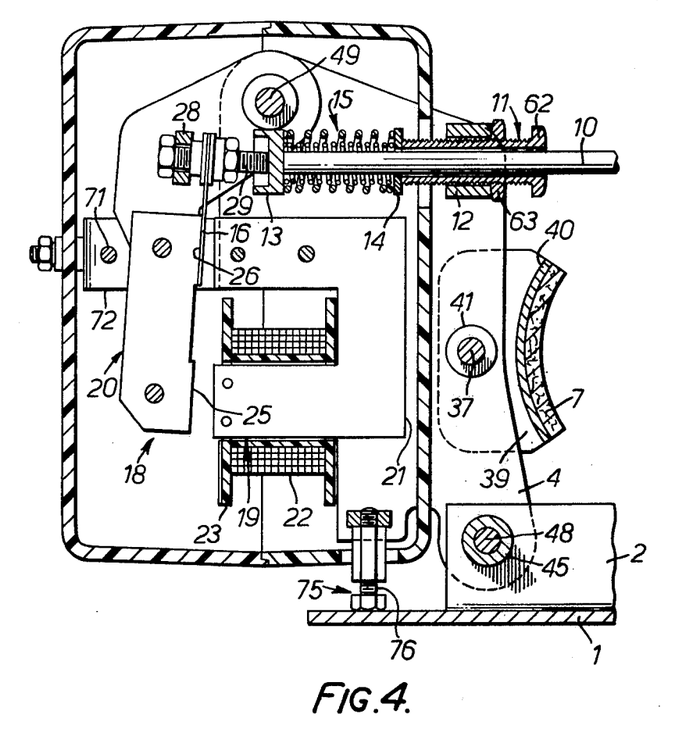
FIG. 4 shows a fragmentary sectional view taken on the line IV—IV in FIG. 2.

Such brake releasing movement of push rod 10 is achieved by means of an electromagnetically operated brake release mechanism which is designated in FIG. 1 generally by the reference numeral 18. The brake release mechanism 18 comprises a core assembly 19 and an armature assembly 20. Core assembly 19 is constituted by a generally U-shaped core piece 21 formed of a plurality of correspondingly U-shaped magnetic laminations sandwiched between the side plates of magnetic arm 4, and an energizing winding 22 formed on a rigid synthetic plastic material former 23 mounted on one limb of the U-shaped core piece 21. Armature assembly 20 is constituted by a pair of armature side plates riveted together and sandwiching therebetween a stack 24 of generally I-shaped magnetic laminations formed with slightly projecting pole locations at 25 and 26, and is adapted to be suspended pivotally from a location 27 between the plates comprising magnetic arm 4 as shown. A bridging piece 28 extends between the armature side plates and carries a thrust pin 29 the free end of which engages the recessed end of fixed spring seat 13. A stop limits the extent of clockwise pivotal movement afforded to armature assembly 20. As shown in FIGS. 1 and 4, a thin plate 16 is mounted on the thrust pin 29 so as to extend into the air gap between pole face 26 of the armature assembly 20 and the opposed upper pole of the U-shaped laminations 21 constituting the core assembly 19. This plate 16--which is preferably formed of stainless steel--ensures that the air gap is maintained despite any slight hammering back of the pole faces which might occur with prolonged use.

The basic operating principle of the illustrated brake mechanism can be appreciated from the aforegoing general description. In the de-energized condition of brake release mechanism 18, the force in compression spring 15 urges the push rod 10 in a right-to-left direction thereby pulling the arms 3, 4 together so that the brake blocks engage with the brake drum. This condition is as shown in FIG. 1. Upon energization of the brake release mechanism, i.e. by driving energizing winding 22 with an appropriate electric current, armature assembly 20 is pivoted anticlockwise towards core assembly 19, by virtue of the magnetic attraction between the two assemblies, and the thrust pin 29 applies a corresponding movement to the push rod 10 against the action of spring 15 which serves to push the brake arms 3, 4 apart thereby to release the brake.

The parts above-described with reference to FIG. 1 will now be considered in fuller detail in order that advantageous constructional features of the illustrated brake mechanism might be appreciated. Stated dimensions are exemplary for a 150 mm brake and will vary depending upon brake size.

The base 1 consists of a 5mm sheet steel pressing provided with a number of fixing holes, and the base angle sections 2 are each formed of 3mm sheet steel and are each provided with fixing holes for correspondence with the fixing holes in the base 1 and with two bearing holes in the upright portion thereof for accepting the pivotal mountings of the arms 3 and 4. The two base angle sections 2 are fixed to the base spaced from and parallel to one another as can be seen clearly from FIGS. 1 and 3, and two bearing bushes 30 (see FIG. 3), each comprising a hollow cylindrical member with reduced end portions, are welded between the angle sections 2 with the reduced end portions received in the bearing holes in the angle section uprights.

Plain arm 3 consists of a pair of 3mm sheet steel pressings 31 and 32 maintained precisely aligned and precisely spaced from one another by a pair of distance posts 33 having reduced ends which are riveted into receiving holes formed in the pressings 31, 32. A pivot pin boss 34 is welded to each pressing to accommodate a pivot pin 35 providing the pivotal connection of the plain arm 3 to the base 1. The pivot pin 35 is retained by appropriate circlips. A further boss 36 is welded to the inner side of each pressing 31, 32 to accommodate a hinge pin 37 which serves to mount the brake shoe 5 to the plain arm 3. Finally, the upper end of each pressing 31, 32 is formed with a precise hole serving to receive a respective end of a coupling 38 which serves to secure the right hand end of push rod 10 to the plain arm 3.

The brake shoes 5 and 6 are identical one to the other. Each comprises a pair of side pieces 39 and a curved frontspiece 40 all formed as pressings of 3mm sheet steel. The connected edges of the side pieces 39 and the frontspiece 40 have interdigitated castellations which are welded together to provide a robust construction neat in appearance. Brake blocks 7 are riveted to the frontspieces of the two brake shoes. A hinge pin boss 41 is projection welded to each side piece 39 to receive the hinge pin 37 which secures the brake shoes 5, 6 to the arms 3, 4.

Figure 3:
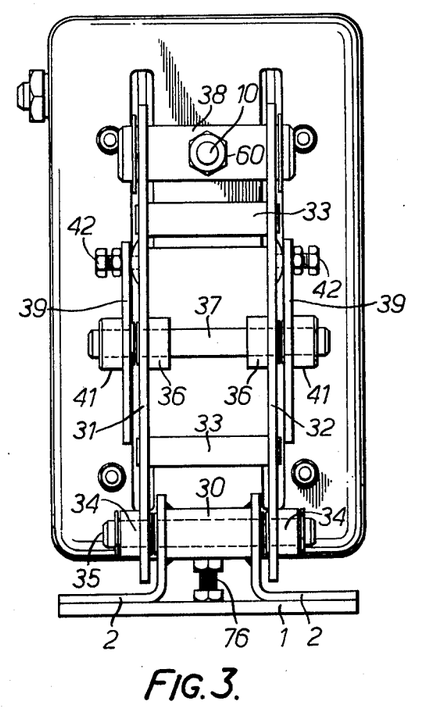
FIG. 3 shows an end elevation view of the brake mechanism of FIGS. 1 and 2 viewed from the right hand side.

An adjustable friction connection between brake shoes 5, 6 and their supporting arms 3, 4 is provided by conical springs supported by bolts 42 which bear against the arms 3, 4 as shown in FIG. 3; this frictional connection ensures that when the brake is released, the brake shoes do not pivot downwardly under their own weight and trail against the brake drum, but instead maintain their brake-on positions relative to the arms 3, 4.

The magnetic arm 4 is constructed similarly to the plain arm 3 but is more complex in that it serves to support the electromagnetic brake release mechanism 18 comprising core assembly 19 and armature assembly 20, and also provides a mounting for the compression spring 15 and for the actuating end of push rod 10. The magnetic arm 4 per se consists of a pair of 3mm sheet steel plates secured together in spaced parallel configuration by three welded distance posts similar to the posts 33 employed in the construction of plain arm 3. The shape of the plates can be seen most clearly from FIGS. 5 and 6 where they are referenced 43 and 44. Pivot pin bosses 45 and hinge pin bosses 46 and 47 are welded to the plates 43 and 44 as shown respectively to accommodate a pivot pin 48 coupling magnetic arm 4 to base 1, a hinge pin 49 coupling armature assembly 20 to magnetic arm 4, and the hinge pin 37 coupling brake shoe 6 to magnetic arm 4. A cover mounting bracket 50 is secured to each of the plates 43, 44 and serves for mounting a box-like cover which provides protection for the electromagnetic components of the brake mechanism.

Figure 5:
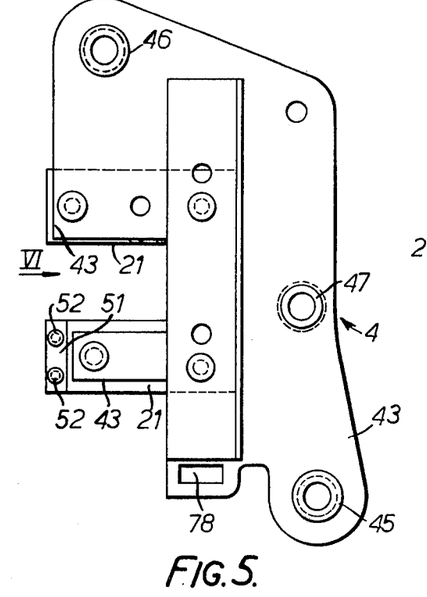
FIG. 5 shows a side elevational view showing a magnetic arm and core assembly forming part of the brake mechanism of FIGS. 1, 2 and 3.
Figure 6:
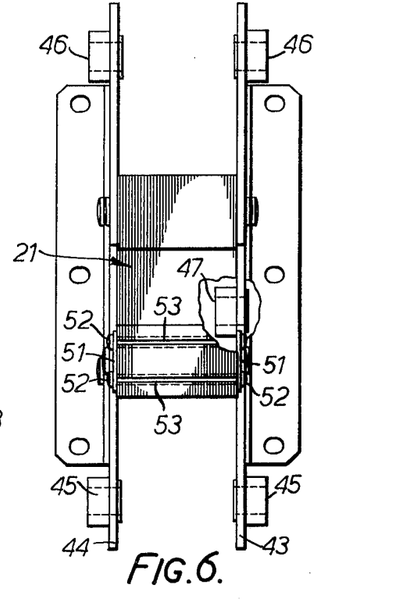
FIG. 6 is an elevational view of the assembly of FIG. 5 in the direction of the arrow VI in FIG. 5.

The core assembly 19 of the electromagnetic brake release mechanism 18 is mounted between the side plates 43, 44 of magnetic arm 4 as shown most clearly in FIG. 6. The core assembly 19 comprises a plurality of generally U-shaped laminations 21 which are held in position by the welded-in distance pieces securing plates 43 and 44 together. As shown in FIG. 5, the ends of the limbs of the stack of U-shaped laminations 21 project beyond the adjacent parts of the plates 43, 44 and the faces of the 'pole pieces' thus defined are ground to a precise flatness. The lowermost of the two 'pole pieces' incorporates an arrangement for damping the actions of the core and armature assemblies; this arrangement has a damper plate 51 secured on each side of the 'pole piece' by means of riveted damper pins 52, and has slots 53 (FIG. 6) cut into the face of the 'pole piece' to the depth of the damper pins 52. The damper arrangement provides a circuit for current flow transverse to the laminations 21 in the damper plates 51 and the damper pins 52 in response to changing flux in the laminations 21 which current flow generates a counter flux such as to damp the movements of the armature assembly 20 relative to the core assembly 19.

An energizing winding 22 (see FIG. 1) wound on a rigid synthetic plastic former 23 is mounted on and around the lower limb of the stack of laminations constituting the core assembly 19.

Figure 2:
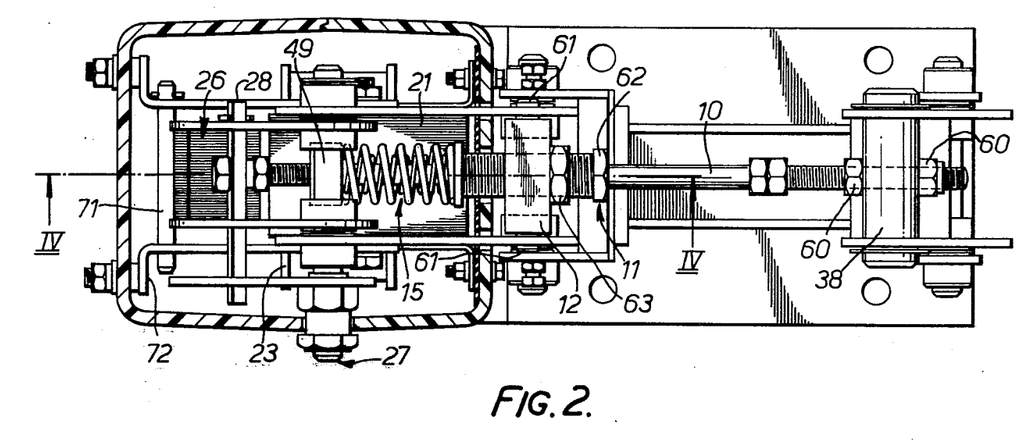
FIG. 2 shows a top plan view of the brake mechanism shown in FIG. 1.
Figure 7:
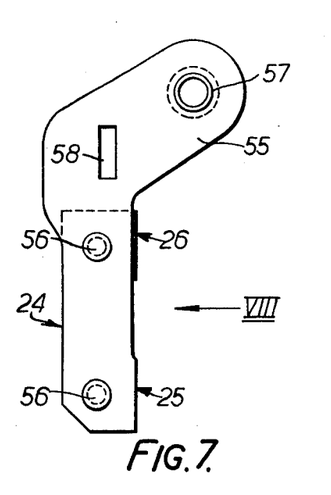
FIG. 7 is a side elevational view of an armature assembly forming part of the brake mechanism of FIGS. 1, 2 and 3.
Figure 8:
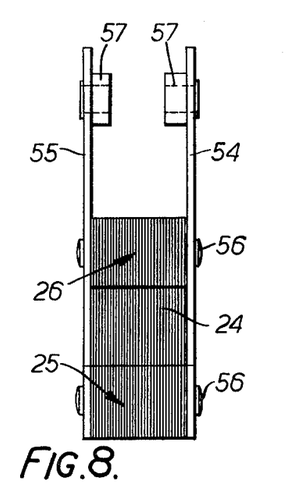
FIG. 8 is an elevational view of the assembly of FIG. 7 in the direction of the arrow VIII in FIG. 7.

The armature assembly 20 is shown most clearly in FIGS. 7 and 8 and can be seen to comprise two side pieces 54 and 55, formed of 3mm sheet steel, maintained in spaced parallel relationship by welded distance posts 56 and sandwiching therebetween a stack of laminations 24 formed to provide pole faces at 25 and 26. A hinge pin boss 57 is welded to each side piece 54, 55 for accommodating the hinge pin 27 (see FIG. 1) which couples the armature assembly 20 to the magnetic arm 4. A slot 58 is cut out of each side piece 54, 55 and serves in the assembled brake mechanism to accommodate the bridging piece 28 (see FIG. 1) which carries the thurst pin 29 acting on the end of fixed spring seat 13. As shown in FIG. 2, and extension of the bridging piece 28 is rigidly coupled with a member 59 which is journalled on pivot pin 49 and projects through the cover of the mechanism to provide a facility for manual release of the brake.

The details of the operating linkage 9 and its cooperation with the compression spring 15 and armature assembly 20 will now be described with particular reference to FIGS. 1, 2 and 4. Push rod 10 is a steel rod the right-hand end of which (as viewed in FIG. 1) has a screw threaded portion which passes freely through a diametric bore formed in the coupling 38. Locking nuts 60 serve to adjustably secure the end of push rod 10 relative to coupling 38. The rod 10 extends freely through an axial bore formed in brass bush 11 which is in turn screw-threadedly, and thereby adjustably, secured in a steel block 12 pivotally mounted on stub shafts 61 engaged in receiving holes in the side plates 43, 44 of magnetic arm 4. Brass bush 11 is formed with a hexagonal end 62 whereby the position of the bush 11 in block 12 can be adjusted, a locking nut 63 being provided to lock the bush 11 in the block 12, and at the other end provides an abutment for the floating spring seat 14. Rod 10 passes completely through the bush 11 and ends, on the left-hand side of FIG. 1, in the fixed spring seat 13. The space between the fixed spring seat 13 and the floating spring seat 14 abutting bush 11 serves as a capture location for compression spring 15 which is formed as a double helical spring. The adjustment of the bush 11 in the block 12 serves to set the compression of spring 15 and thereby determines the brake torque of the brake mechanism. The adjustment afforded at the screw-threaded end portion of push rod 10 enables the working clearances of the brake blocks 7 from the brake drum 8 to be adjusted through adjustment of the effective length of push rod 10.

Other details of the illustrated brake mechanism which have not previously been mentioned herein are the back stop 70 (see FIG. 1) provided to limit the extent of clockwise pivotal movement of armature assembly 20, and the adjustable stop 75 (see FIG. 1) provided to enable the working movement of the two brake shoes to be balanced. The back stop 70 comprises a pin 71 releasably located in holes provided in two metal brackets 72 secured to the side plates 43 and 44 of magnetic arm 4; these same brackets provide fixing points for the lid of the box-like casing. Release of the pin 71 enables armature assembly 20 to be pivoted clockwise to clear coil 22 for replacement. The adjustable stop 75 is comprised by a post 76 screw-threadedly engaged with a bar 77, the ends of which are lodged in receiving slots 78 (see FIG. 5) cut in the side plates 43, 44 of the magnetic arm 4, and abutting at its lower end against the base plate 1, the effective length of the post 76 from the bar 77 to base plate 1 being adjustable by virtue of the screw-threaded engagement of the post 76 with the bar 77. As will be appreciated, adjustment of the effective length of post 76 determines the maximum counter-clockwise pivotal movement of magnetic arm 4 and therefore determines the maximum brake-releasing movement which can be applied to arm 4 by the brake release mechanism; suitable adjustment of the effective length of post 76 and of the effective length of push rod 10 enables the working movements of the two brake arms 3 and 4 to be equalized.

It will be noticed that the construction of the brake mechanism herein described takes considerable advantage of sheet steel pressings. It has been traditional in this art to construct brake mechanisms employing metal castings for such parts as the base, the arms, the brake shoes etc. To obtain a sufficient degree of dimensional precision, the castings used of old required a number of finishing machinings. The sheet steel pressings employed in the above-described brake mechanism are dimensionally precise in themselves, and afford further advantages in respect of their light weight (as compared with castings) and superior strength. This departure from traditional construction methods provides significant advantages, for example witness the simplicity of construction of the electromagnetic brake release mechanism, wherein the magnetic laminations are conveniently sandwiched between structural sheet metal pressings, and the simplicity of the brake shoes.

The location of the compression spring 15 also represents a notable feature of the described brake mechanism. It has been known to have the spring located adjacent the base between the lower ends of the plain and magnetic arms, with the spring acting on extensions of the arms downwards beyond their pivotal connections to the base. The positioning of the spring in the upper position shown has a number of advantages. Firstly, it enables the height of the brake mechanism to be reduced by obviating the need for the just-mentioned arm extensions which enables the pivotal connections of the arms to the base to be made closer to the base. Secondly, it enables a more efficient arrangement of the spring to be realized as compared with the just-mentioned known arrangement wherein the brake torque developed at the brake blocks by the spring was subject to the mechanical disadvantage occasioned by the spring force acting on a short lever (the above-mentioned arm extensions) to develop a brake torque applied over a relatively long lever (i.e. the arms themselves); inter alia, this enables a less powerful lighter duty spring to be used to develop the same brake torque which simplifies the housing and servicing of the spring.

A further significant advantage can obtain from the clean arrangement of the plain arm which, on releasing the push rod 10 from the coupling 38, enables the plain arm to be laid flat. This facility can be advantageous in regard to the fitting of the brake to an existing installation where there is minimum clearance beneath the brake drum. Whereas hitherto it may have been necessary to dismantle the plain arm completely from the brake mechanism for fitting the brake mechanism into an existing installation, the present arrangement might merely require the plain arm to be pivoted flat with the base.

It will be noted furthermore that the opening of the connection between the push rod and the plain arm for installation of the brake mechanism does not interfere with the brake torque setting.

The arrangement of the compression spring 15 is designed for facilitating spring force adjustment for setting the brake torque, the adjustment of the bush 11 in the block 12 providing this adjustment. The brake torque can be precisely set and, by virtue of the limited range of adjustment afforded to bush 11 in block 12, it can be made impossible to over-torque the brake mechanism.

We claim:

1. Brake apparatus for braking a brake drum, comprising a pair of brake arms each constructed as an assembly of at least one sheet metal pressing, a base formed as an assembly of at least one sheet metal pressing, said arms each being pivotally coupled to said base, a brake block mounted on a brake shoe carried by each said arm, said brake blocks being arranged for engagement with opposite sides of the brake drum, said brake shoes being carried by said brake arms at intermediate locations thereon, a rod pivotally coupled with the end thereof which is coupled with said base, a fixed spring seat associated with the other of said brake arms and formed to provide a passage therethrough for receiving said rod, said rod extending through said passage, a floating spring seat at the end of said rod spaced from said fixed spring seat, a compression spring assembled between said fixed and floating spring seats and around said rod and serving to bias said brake arms about their pivots to urge the brake blocks towards one another for effecting braking of the drum, and a powered brake release mechanism arranged for exerting upon said rod a force to overcome the spring biassing of the arms and to pivot the arms apart, thereby to release the brake blocks from the drum.

2. A brake as claimed in claim 1 wherein said powered brake release mechanism comprises an electromagnetic arrangement having an armature assembly and a coil assembly, the said armature assembly being pivotally mounted on the said other of the brake arms and the said coil assembly being fixedly mounted thereon, and means being provided to transmit a brake releasing movement of the armature, responsive to energization of said coil, to said rod.

3. A brake as claimed in claim 2 wherein said coil assembly of the electromagnetic arrangement comprises a core assembly constituted by a stack of laminations, and the said lamination are sandwiched between a pair of sheet metal pressings constituting the respective hinge arm.

4. A brake as claimed in claim 3 wherein said laminations are generally U-shaped, and said coil assembly of the electromagnetic arrangement includes an energizing winding mounted on and around one limb of the lamination stack.

5. A brake as claimed in claim 4 wherein said armature assembly is arranged generally to bridge the ends of the U-shaped laminations, and comprises a stack of laminations sandwiched between a pair of sheet metal side pieces having extensions providing a pivotal mounting for the armature assembly.

6. A brake as claimed in claim 2 wherein said armature assembly includes a thrust pin in abutting relationship with the end of said rod, the end of said thrust pin being received in an indentation formed for the purpose in the head of the floating spring seat.

7. A brake as claimed in claim 1 wherein said fixed spring seat is adjustable relative to the said other brake arm whereby the compression of said spring may be adjusted.

8. A brake as claimed in claim 1 including an adjustable stop associated with one of the brake arms to determine the maximum extent of pivotal movement thereof away from the other brake arm.

* * * * *